March 19, 1957 H. SIMPSON 2,785,475
TYPE ALIGNING GAUGES FOR TYPEWRITERS
Filed March 29, 1955

INVENTOR,
Herbert Simpson

United States Patent Office 2,785,475
Patented Mar. 19, 1957

2,785,475

TYPE ALIGNING GAUGES FOR TYPEWRITERS

Herbert Simpson, Toronto, Ontario, Canada

Application March 29, 1955, Serial No. 497,743

6 Claims. (Cl. 33—183)

The invention relates to improvements in type aligning gauges for typewriters as described in the present specification and shown in the accompanying drawings that form a part of the same.

It frequently happens that it becomes necessary to replace a damaged type or to re-align a type which has moved out of alignment with the remaining ones, and in each case in the process of correction of the fault the exact position the type must assume on its bar so that the character, or characters, thereon will line up with those carried by the other bars, must be ascertained and the type must be placed on its bar in such predetermined position and the parts held to engagement while being soldered together.

Devices of various types have heretofore been proposed to line up the type in respect to the bar to which it is to be secured and to hold the parts during the soldering process but serious disadvantages have attended the use of such devices. Such of said devices as were intended to be applied to the typewriter during use could not be applied to the machine without first having the carriage removed therefrom. The use of other known devices which are not intended to be applied to the typewriter for the repair operation necessitates the removal of the type bar concerned, and the consequent replacement thereof, thus making the repair job time consuming and costly with some chance of damage to the machine or, of interference with the previously correct setting of the whole series of type bars.

The main object of the present invention is to provide a type aligning gauge by means of which the aligning and soldering of type in typewriters can be accomplished quickly and accurately without removing the carriage, the type bar, or other parts of the machine.

Another object of the present invention is to provide a type aligning gauge which is universally adjustable whereby the setting of the gauge can be accomplished with equal facility and accuracy in respect to any type bar of the machine irrespective of its position in the sector.

Another important object of the invention is to provide a type aligning gauge which can be accurately set by means of a correctly aligned type carried on a typebar other than the one requiring its type adjusted and the latter bar substituted for the model bar and the type lined up thereon and securely held in position while the soldering operation is being carried out.

A further object of the invention is the provision of a type aligning gauge which can be quickly applied to any of the majority of models of typewriters now in use whether standard, electric or portable.

And generally the objects of the invention are to provide an efficient, sturdy and compact type aligning gauge which can be produced at small cost.

With the above and other objects in view the invention consists in the novel features of construction, arrangements and combinations of parts set out herein and more particularly pointed out in the claims for novelty following.

In describing the invention reference will be made to the accompanying drawings, in which.

Like numerals of reference indicate corresponding parts in the various figures.

Figures 1, 2:
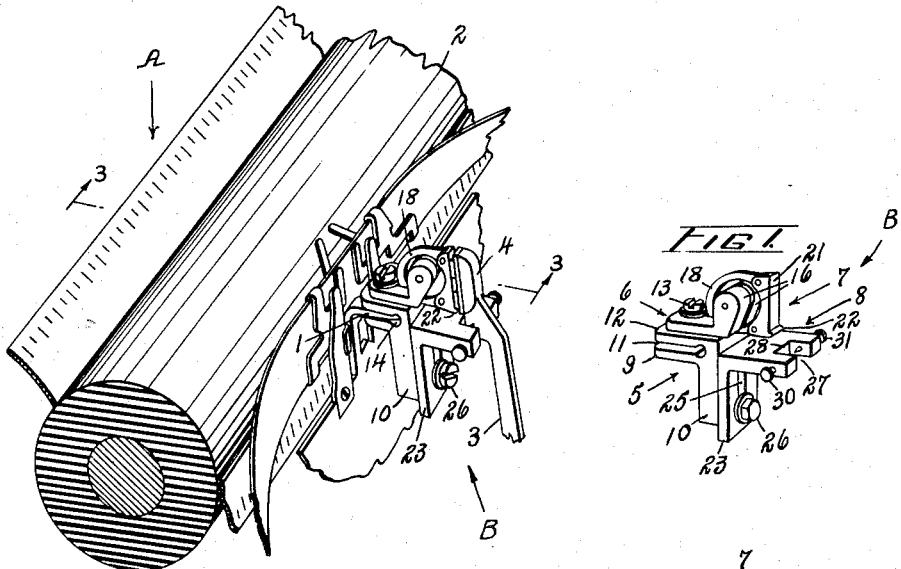
Figure 1 is a perspective view of my improved type aligning gauge.
Figure 2 is a fragmentary view in perspective of a portion of a typewriter with my aligning gauge attached thereto.
Figure 3:
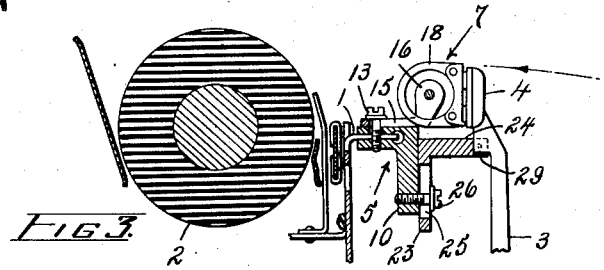
Figure 3 is a cross section taken on the line 3—3 of Figure 2.

Referring to the drawings and particularly first to Figures 1 to 4, inclusive, in which a complete embodiment of the invention is shown, A denotes generally the upper front part of a typewriter which includes a forwardly extending forked type guide 1, located in advance of the platen 2 and 3 denotes one of the type bars mounted in the conventional sector (not shown) and swingable upwardly to move the type 4 carried on its outer end into striking position between the arms of the type guide 1.

B denotes my gauge as a whole which consists of four main relatively adjustable parts, namely, a body 5 which is adapted to be clamped to the type guide 1 of the machine, a type setting adjusting gauge holder 6 which is carried on the top face of the body 5 and is adjustable on a horizontal plane, an annular type setting adjusting gauge 7 which is carried by the holder 6 and is rotationally adjustable in a vertical plane, and a type bar clamping member 8 which is carried by the body 5 and is adjustable on a vertical plane.

The body 5 consists of a single, flat sided piece of metal or other suitable and rigid material of right-angle shape in end elevation to provide horizontal and vertical arms 9 and 10, respectively, and in width being substantially equal to the conventional type guide. The arms 9 and 10 have plane horizontal and vertical faces, respectively, meeting at the top front corner of the body. The arm 9 is cut inwardly from its rear edge for a considerable distance in parallel with the top face to provide an opening 11 the full width of the arm and of a depth to conveniently receive the type guide of the machine, so that the gauge can be attached to the machine. The opening 11 is cut sufficiently close to the top of the body that the part 12 forming the top wall of the said opening will be sufficiently thin to be yieldable under pressure from above which may be applied by means of a screw 13 extended loosely through the strap-like part 12 in the transverse centre of the latter and threading into a threaded hole in the top surface of the part 9.

It will thus be apparent that the body 5 which carries the various components of the gauge can be securely applied to the machine by simply bringing the horizontal part of the body into interfitting engagement with the type guide 1 with the end of the latter extended as far as possible into the opening 11 and with its forked end spanning the screw 13, which latter can then be turned down to force the part 12 downwardly and thus lock the type guide firmly between the parts 12 and 9. The opening 11 is preferably enlarged at its inner end, as at 14, to accommodate certain type guides which have their outer ends enlarged, or turned downwardly.

The typesetting adjusting gauge holder 6 consists of a metal plate of a width substantially equalling the body, the rear or base portion being flat bottomed and adapted to rest on the part 12 of said body 5 and the front portion being turned upwardly at right angles to the rear part. The holder 6 is provided with a longitudinal slot 15 extending forwardly from a point not far removed from the extreme rear end of the base part completely through the upturned front end so that there are provided two parallel ears 16, spaced to receive between them the substantially semi-circular frame part 18 of the adjusting gauge 7. The typesetting adjusting gauge holder is held to the body by means of the set screw 13 which extends through the slot 15 in said holder and which permits of the moving of the holder to any desired horizontal position within the limits of said slot, and the locking thereof to such position.

A screw 19 extending loosely through one of the ears 16 and threading into a threaded opening in the inner wall of the other ear provides means for providing, or releasing clamping pressure on the frame part 18 of the typesetting adjusting gauge 7, so as to permit of the adjustment of the said gauge 7 in relation to a type bar held by the type bar clamping member 8, as will be explained in detail hereinafter.

The typesetting adjustment gauge 7 consists of a block, or other device, suitably secured to the annular frame member 18 and presenting a plane face 21 of substantially rectangular shape set vertically and being provided with a transverse rib 22 along its lower end adapted to be set, through the adjustment of the frame part 18, in aligned engagement with the lower end of a correctly aligned type of a type bar which has been brought to striking position.

The type bar clamping member 8 comprises a vertical arm 23 and a horizontal arm 24 extending forwardly from the top end thereof. The vertical arm is adapted to lie in surface engagement with the front face of the body part 10 and has a longitudinal slot 25 therethrough for the reception of an adjusting screw 26 which extends into threading engagement with the wall of an opening in the face of the body part 10 so that the vertical position of the type bar clamp can be adjusted as required.

The horizontal arm 24 of the type bar clamp 8 is cut away medially of its forward end to provide a recess 27 directly aligned with the face of the typesetting adjusting gauge 7 and adapted to receive a type bar which has been moved to its striking position. This recess 27 has a squared base 28 providing an abutment for the shoulder 29 with which every type bar is provided. The type bars of the various makes of typewriters are not standard in length hence the necessity for the vertical adjustment of the type bar clamping member, which is provided by the set screw 26 and the slot 25 in the arm 23.

30 and 31 are set screws threading through the side walls of the recess 27 in opposition to one another. These set screws are for the purpose of clamping the type bar in central relation to the face of the typesetting adjusting gauge 7 and in order to prevent distortion of the type bar being clamped the opposing ends of the set screws are preferably pointed.

In the use of this invention the type aligning gauge is moved into position where the type guide 1 of the machine will lie between the members 9 and 12 of the body of the gauge. The gauge is then set facing forwardly towards the type bar and the set screw 13 is then turned down to lock the gauge to the type guide. A key of a type bar carrying a correctly aligned type is then struck to bring its type into striking position. The position of the shoulder 29 of the type bar is then noted and if it does not engage the face of the base 28 of the recess 27 the type bar clamping member 8 will then be adjusted vertically to bring the parts 28 and 29 into alignment. When this alignment has been brought about the set screws 30 and 31 are tightened up to cause them to grip the type bar. The typesetting adjustment gauge 7 is then freed by looseningg the set screw 19 to permit the frame 18 to turn between the ears 16, after which the said gauge 7 is moved to the position where the transverse rib 22 will lie beneath and in parallel engagement with the lower edge of the type carried by the type bar. If adjustment of the typesetting adjusting gauge holder 6 is necessary towards or away from the type bar this can be accomplished by loosening the set screw 13 and moving the holder to the desired position to make possible the correct relationship between the members 7 and 3, after which the screw 13 is again tightened up. The set screw 19 is now turned in the direction to cause the ears 16 to close tightly over the member 18 and thus hold the rib 22 in alignment with the type. This correct relationship is clearly shown in Figure 3. The screws 30 and 31 are next turned to release the holding pressure on the type bar and thus allow it to return to its at-rest position.

The type bar, carrying the type requiring to be realigned or, to which a new type is to be soldered, is then brought into position in the recess 27 with its part 29 abutting the base 28 of the recess, and securely clamped by means of set screws 30 and 31. The type to be soldered to the type bar is now inserted between the vertical face of the type bar and the face of the typesetting adjusting gauge and moved to position where its lower edge will lie against the rib 22 of the said adjusting gauge and when in such position the type is in alignment with respect to the remaining accurately positioned type of the machine and is ready to be soldered to the type bar. For convenience and in order that the molten solder when applied to the type and its bar will flow to the desired location it is preferable that the machine be now turned over onto its back in which position the soldering process can be carried out quickly and conveniently and when the solder has cooled the type bar can be released and allowed to drop to its allotted position in the sector, upon which the type aligning gauge can be quickly removed from the machine.

Figure 5:
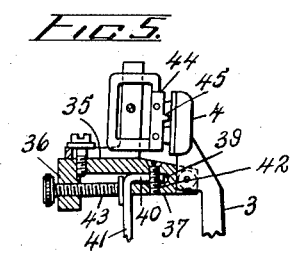
Figure 5 is a vertical section through a modification of the device shown in Figure 1, incorporated with the appropriate typewriter parts.
Figure 6:
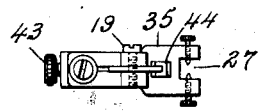
Figure 6 is a plan view of the device shown in Figure 5, detached from the typewriter.
Figure 4:
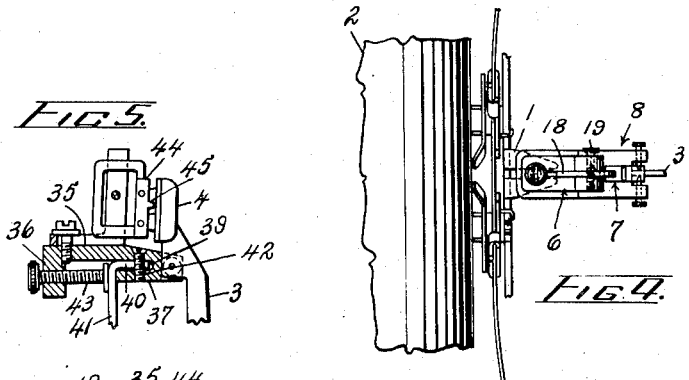
Figure 4 is a plan view of Figure 1, on a reduced scale.

In Figures 5 and 6 a modified form of type aligning gauge is shown for use on those makes of machines in which provision is made for the ready removal of the platen.

In this modified structure the type guide clamp and type bar clamping member are cast in one piece to provide a horizontal plate 35, the rear part having a downwardly depending flange 36 at its end and the forward half of the plate being inclined downwardly slightly to its front end in which is located the type bar receiving recess 27 and the opposing pointed set screws 30 and 31. This inclined forward part of the member 35 has a rearwardly extending flat arm 37 spaced from the plate 35 to provide an opening 39 adapted to receive the horizontally disposed forked type guide 40 supported by the vertical part 41. The arm 37 terminates considerably short of the rear flange or wall 36 so as to permit of the ready entry of the type guide into the opening 39. A screw 42 extends downwardly through the horizontal plate 35 across the opening 39 in substantially the transverse centre of the latter and threads into the arm 37 and is adapted to be spanned by the forked end of the type guide.

A set screw 43 threading inwardly through the flange 36 in opposition to the end of the arm 37 provides means for clamping the vertical member 41 tightly against the end of said arm 37 to hold the type aligning gauge securely on the type guide while in use.

In this embodiment of the invention the typesetting adjusting gauge 44 is adapted to be lined up with the lower edge of the topmost character of the type, as shown in Figure 5, instead of with the lower edge of the lowermost character, as in the embodiment of the invention shown in Figures 1 to 4, and to this end a transverse aligning rib 45 is located substantially midway of the height of the face of the gauge 7.

It will have been apparent from the foregoing description that by means of the present invention the replacement or re-alignment of a type, or types, can be accomplished quickly and accurately and without having to remove the type bear or the carriage.

What I claim is:

1. In a type aligning gauge for typewriters, a body adapted to be clamped to the type guide of a typewriter, said body having a plane vertical face a type bar clamp carried by and adjustable vertically on said plane vertical face of said body, means carried by said type bar clamp to receive a type bar and hold same to a raised position, a typesetting adjusting gauge holder mounted on said body, a typesetting adjusting gauge rotationally adjustable in a vertical plane in said holder, said typesetting adjusting gauge having a transverse rib thereon adapted through the adjustment of said gauge to be lined up with a correctly aligned type carried by a type bar being held by said type bar clamp, means carried by said typesetting adjusting gauge holder for locking said typesetting adjusting gauge to its adjusted position wherein said type bar carrying said correctly aligned type may be removed from engagement with said type bar clamp without interfering with the set of said typesetting adjusting gauge, and a typeless bar substituted therefor in said type bar clamp for the reception of a type adapted on being placed on said type bar to come to rest against and to be aligned by engagement with said rib carried by said typesetting adjusting gauge.

2. In a type aligning gauge for typewriters, a body adapted to be clamped to the type guide of a typewriter, said body having a plane top face and a plane vertical face meeting the horizontal face at the top front corner of said body, a type bar clamp adjustable vertically on the vertical face of said body, said type bar clamp having a recess in its forward end to receive a type bar in abutting engagement with the inner wall of said recess below the type carrying part of said type bar, clamping means carried by said type bar clamp to hold said type bar in said recess, a typesetting adjusting gauge holder mounted on said horizontal face of said body and adjustable towards and away from said type bar clamp, a typesetting adjusting gauge mounted in said holder for rotational adjustment in a vertical plane rearwardly of and in longitudinal alignment with said recess, said typesetting adjusting gauge having a transverse rib thereon adapted through the adjustment of said typesetting adjusting gauge to be lined up with the correctly aligned type of type bar held in said recess and thus provide a guide for the positioning of a type on a type bar subsequently substituted for the type bar carrying said correctly aligned type, and means for locking said typesetting adjusting gauge to its adjusted position whereby on the substitution of a typeless type bar in said recess for the said type bar to the type of which said rib has been adjusted said rib will provide an abutment for a type placed on said typeless bar and will hold same in correctly aligned relation to the remaining correctly aligned type during the soldering operation.

3. A type aligning gauge for typewriters according to claim 2, characterised in that said body is provided with a horizontal opening in its rear wall near its top for the reception of the type guide of a typewriter and the top wall of said opening is movable inwardly under the influence of a set screw extending loosely through said top wall and threading into the bottom wall of said opening to clamp said body to said guide.

4. A type aligning gauge for a typewriter, according to claim 3, characterised by the fact that said typesetting gauge holder is enlarged upwardly at its front end and is cut lengthwise in its transverse centre from a point near its rear end through said upwardly enlarged part and is adjustable lengthwise through the medium of a set screw which extends through said lengthwise cut.

5. A type aligning gauge for a typewriter according to claim 4, characterised in that a set screw extends through one of the parallel ears provided by said longitudinal cut through said typesetting adjusting gauge holder and threading into the inner face of the other ear and provides a bearing for said typesetting adjusting gauge and also constitutes the means for locking said typesetting adjusting gauge to its adjusted positions.

6. A type aligning gauge for a typewriter, according to claim 2, in which said means carried by said type bar clamp to hold a type bar in said recess comprises pointed screws threading through the side walls of said recess in opposition to one another and adapted to engage the sides of the type bar to centralize and hold same.

References Cited in the file of this patent

UNITED STATES PATENTS

| | | |
|---|---|---|
| 1,983,904 | Hewitt | Dec. 11, 1934 |
| 2,486,171 | Kegevic | Oct. 25, 1949 |